United States Patent Office 3,455,783
Patented July 15, 1969

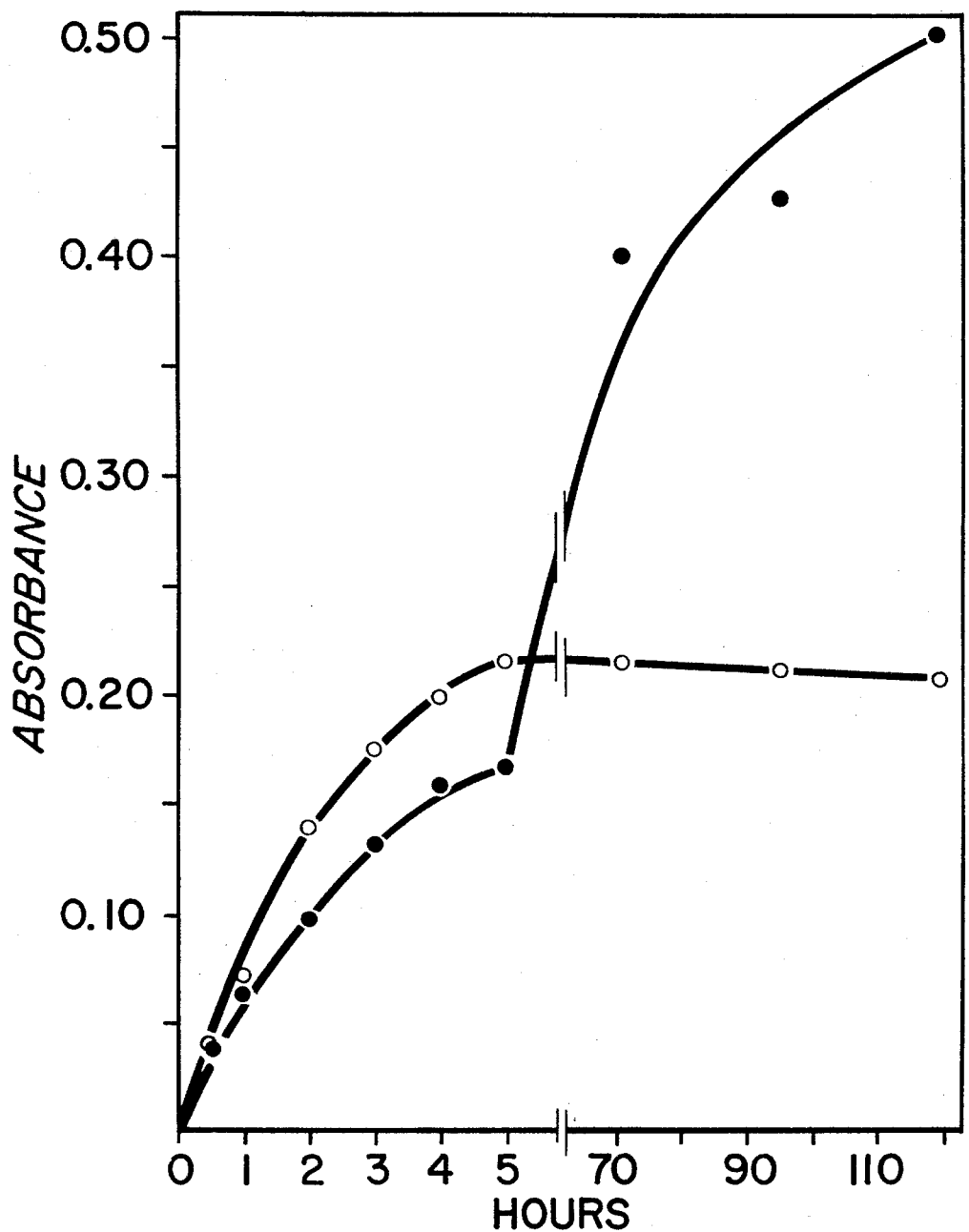

3,455,783
CONTROL OF ENZYME ACTIVITY IN NONFLUID GELS
Harvey E. Alburn, West Chester, and Norman H. Grant, Wynnewood, Pa., assignors to American Home Products Corporation, New York, N.Y., a corporation of Delaware
Filed Mar. 11, 1966, Ser. No. 533,546
Int. Cl. C12d 13/06
U.S. Cl. 195—29                                    4 Claims

ABSTRACT OF THE DISCLOSURE

A method of enhancing enzymatic reactions of organic amino acid amide compounds and esters thereof by conducting such reactions in aqueous nonfluid gels.

This invention relates to the control of enzymatic reactions by selection of novel reaction media. More particularly, the invention relates to the control of enzymatic reactions of organic chemicals by conducting such reactions in aqueous nonfluid gels.

The possibility of performing chemical reactions in frozen aqueous solutions; i.e., in ice, has already been demonstrated and the potential advantages of such reactions has already been recognized. Thus, several studies have been published which indicate that chemical reacactions, may, surprisingly, proceed much more rapidly in ice than in liquid water. For example, in the article "Imidazole- and Base-Catalyzed Hydrolysis of Penicillin in Frozen Systems"; N. H. Grant, D. E. Clark and H. E. Alburn, J. Am. Chem. Soc. 82 (1961) 4476; it was demonstrated that the hydrolytic opening of the beta lactam ring of penicillin catalyzed by imidazole and histidine, proceeded at a more rapid rate in ice medium than in water. It was suggested by the authors that the exceptionally high proton mobility in ice might be the reason for the facilitation of fast proton transfer in either nucleophilic or general base catalysis of beta-lactam cleavage.

The similar phenomenon of increased rate or reaction in aqueous frozen systems was found with respect to the acid-catalyzed dehydration of 5-hydro-6-hydroxyuridine in ice, as reported by W. H. Prusoff in his article entitled "Low-Temperature Reversal of the Ultraviolet Photochemical Reaction Product of 2'-Deoxyuridine," Biochim. Biophys. Acta, 68 (1963) 302. The author concluded that the phenomenon could be of value in performing acid catalysis of compounds which are unstable to the high acid strengths required in non-frozen systems. Thus, it was conjectured that reactions in the frozen state might be conducted at about $\frac{1}{1000}$ the acid concentration, in extrapolation of the theory that the ice-reaction medium has holes in which minute amounts of liquid water are present, thereby to provide highly concentrated solutions in each hole in the solid ice medium.

Following the foregoing teachings, A. H. Butler and T. C. Bruice attempted a quantative comparison of reactions in ice and in water media, respectively, as reported in their two papers; namely, "Catalysis in Water and Ice.— A Comparison of the Kinetics of Hydrolysis of Acetic Anhydride, β-Propiolactone, and p-Nitrophenyl Acetate and the Dehydration of 5-Hydro-6-Hydroxy-Deoxyuridine in Water and in Ice," J. Am. Chem. Soc., 86 (1964), 313; and "Catalysis in Water and Ice (II).—The Reaction of Thiolactones with Morpholine in Frozen Systems," J. Am. Chem. Soc. 86 (1964) 4104.

In none of the prior work in this art, exemplified by the foregoing, has there been any suggestion whatsoever that the activity of enzymes can be influenced beneficially by carrying out the enzyme reactions in other than the usual liquid reaction media. The reasons are simply that, from the knowledge in this art up to this time, it has naturally been expected that reaction rates decrease as diffusibility of the reactants decrease. Thus, although essentially nothing has been studied with respect to the action of enzymes in a rigid system, the formation and dissociation of enzyme-substrate complexes in such a system would be fully expected to be minimal, if not substantially completely absent. Moreover, little work has been done in attempting to change the specificity of enzymes.

In accordance with the present invention, it has now been found that, contrary to the conclusion to which those skilled in the art would be led by the prior work, observations and theories of operation of aqueous frozen chemical reaction media systems, and/or the conventional liquid media systems for enzymatic reactions; the activity of enzymes can, in fact, be influenced beneficially by carrying out the enzyme reactions in aqueous reaction media in gel form. More specifically, we have found that, under the proper conditions, the catalytic activity of enzymes can be accelerated or inhibited, or the specificity of a given enzyme can be changed, if the compound (or compounds) to undergo enzymatic reaction is (are) dissolved in an aqueous medium together with the enzyme selected for the catalytic reaction, and the resulting solution is then changed into a non-fluid gel by addition of a gelling agent capable of providing such a gel form and also having certain additional characteristics referred to hereinafter. The resulting solution, prior to addition of the gelling agent, is required to be at a pH in the range of from about 2.0 to about 9.5. For such purpose, where necessary, appropriate adjustment of the pH may be made by addition of conventional basic or acid compound(s) or buffer compositions, in accordance with known procedures in the art. The gel is then maintained in such nonfluid form at a temperature no higher than about 50° C., and the enzymatic reaction is then permitted to proceed. Thereafter, the products may be isolated from the gel by known methods, such as destruction of the gel, leaching, and the like. The term "nonfluid" as used herein has its customary meaning as denoting the characteristic of being incapable of flow. The term "gel" as used herein denotes a disperse system consisting typically of a high molecular weight compound or an aggregate of small particles in very close association with a liquid.

The required characteristics of the gelling agent are (in addition to the primary requirement that it be capable of producing a nonfluid gel of the solution of the selected compound(s) and enzyme) that it have no substantial deleterious effect on the catalytic activity of the selected enzyme, and that it not be reactive with the compound(s) included for the enzymatically catalyzed reaction.

The specific choice of gelling agent is not critical to the method of the invention just as long as the agent has the requisite characteristics noted above. Merely by way of example, known gelling agents such as cellulose, dextran, sodium alginate, hydrophilic gelling starch, gelatin, fibrin, collagen, and the like, may be used as desired. Other useable gelling agents will suggest themselves to those skilled in the art. Similarly, the particular enzyme, which is selected for its requisite activity with respect to the compound(s) used in a given desired synthesis, is not critical to the contemplated exercising of the invention, and need have no other characteristic than that it be of the transfer type, which includes also all of the oxidative enzymes. Merely by way of example of transfer type enzymes generally, trypsin, chymotrypsin, ficin, bromelain, and the like, may be used. Other useable enzymes for causing the desired reaction with respect to the compound(s) selected for reaction, will also suggest themselves to those skilled in this art.

The utility of the invention is based on the fact that enzymes are used commercially to carry out highly specific reactions, usually on labile compounds or mixtures. Any process in which better control of the enzyme activity can be achieved could be made more economical. Thus, the invention is applicable to the synthesis of a wide variety of compounds, such as alcohols, aldehydes, ketones, amines, amides, oximes, carboxylic acid, aromatic compounds, phenols, organo-metallic compounds, heterocylic compounds, organic halogen compounds, and the like. Other classes of organic compounds, for the production of which the method of the invention is applicable, include carbohydrates, peptides, ribosides, ribonucleic acids, deoxyribonucleic acids, lipids, dehydrated compounds, drugs, antibiotics, and the like.

In employing the method of the invention, in addition to the general advantage of increased rate of reaction and other specific advantages referred to hereinbefore, there are also obtained the advantages of permitting the use of reaction conditions which are exceedingly mild, minimizing undesired side reactions, minimization of hydrolysis and attendant reversibility of reaction, and affording yields which are not attainable in liquid solutions.

The following examples are illustrative of the invention and are not to be construed as limiting the scope of the same as defined in the claims appended hereinafter.

EXAMPLE I

L-lysine hydroxamic acid

A solution was prepared containing 0.005 M L-lysine ethyl ester, 0.4 M hydroxylamine hydrochloride, and 3 µg./ml. of trypsin. This solution was adjusted to pH 7.5 with potassium hydroxide and divided into two portions. To one there was added, with stirring, sufficient cellulose (Mn-Cellulose Powder 300) to give a 25% gel. The reaction was allowed to proceed in the gel and in the free solution at 1° for 119 hours, giving the results shown graphically in the single figure of the drawing, wherein the filled circles indicate the plotting of the progress of the reaction in the gel as demonstrated by amount of absorbance at various times, of the hydroxamic acid-iron complex under acid conditions, and the unfilled circles indicate similar plotting of the progress of the reaction obtained in the usual liquid medium.

It is evident that initially the rate in bulk solution exceeds that in the gel, but that between the first and third day, the hydroxylaminolysis ceases and is partially reversed in bulk solution. The reaction proceeds quite vigorously in the gel throughout the observed period, however. In the gel, therefore, the major possible side reaction, hydrolysis, has been suppressed in favor of the desired reaction.

EXAMPLE II

L-tyrosine hydroxamic acid

The procedure of Example I is repeated, but with the respective substitutions of L-tyrosine ethyl ester and chymotrypsin for the ethyl ester and enzyme used in the previous example. As before, the reaction proceeds vigorously in the gel system throughout the observed period of 119 hours, but for only a part of the period in the bulk solution.

We claim:

1. A method of causing the enzymatic reaction of one or more organic compounds which comprises dissolving: (1) an amine compound selected from the group consisting of basic amino acid amides, basic amino acid esters, aromatic amino acid amides, and aromatic amino acid esters, (2) a nucleophilic compound capable of reacting with said selected compound, and (3) an enzyme selected from the group consisting of trypsin and chymotrypsin, in an aqueous solvent at a pH in the range from about 2.0 to about 9.5 with the provisos that when the amine compound selected is of said basic category, the enzyme is always trypsin, and when the amine compound selected is of said aromatic category, the enzyme is always chymotrypsin; selecting a gelling agent which is capable of forming a nonfluid gel of the resultant aqueous solution of said compounds and enzyme, and which has substantially no deleterious effect on said enzyme, and no reactivity with said compounds; adding said gelling agent to the resulting solution until a nonfluid gel is formed; maintaining the resulting system in nonfluid gelled state at a temperature no higher than about 50° C., for a period of time to permit the enzymatic reaction to occur; and then isolating from said gelled system at least one compound formed by the enzymatic reaction in said gelled system.

2. A method as defined in claim 1 wherein said compounds are L-lysine ethyl ester and hydroxylamine, said enzyme is trypsin, said gelling agent is cellulose, and the resulting compound isolated is L-lysine hydroxamic acid.

3. A method as defined in claim 2 wherein the aqueous solvent, in which are dissolved said L-lysine ethyl ester, said hydroxylamine and said trypsin, is adjusted to pH 7.5, prior to formation of the gel by addition of said cellulose.

4. A method as defined in claim 1 wherein said compounds are L-tyrosine ethyl ester and hydroxylamine, said enzyme is chymotrypsin, said gelling agent is cellulose, and the resulting compound isolated is L-tyrosine hydroxamic acid.

References Cited

Dixon et al.: "Enzymes" (1958), pp. 182–227.

LIONEL M. SHAPIRO, Primary Examiner

U.S. Cl. X.R.

195—30, 68